United States Patent [19]
Huber et al.

[11] Patent Number: 5,849,347
[45] Date of Patent: Dec. 15, 1998

[54] METHOD AND APPARATUS FOR APPLICATION OF ANTI-AGGLOMERATION PARTICULATES ONTO CUT EXTRUDATES

[75] Inventors: Gordon R. Huber; Gerry M. Hertzel; Bradley S. Strahm, all of Sabetha, Kans.

[73] Assignee: Wenger Manufacturing, Inc., Sabetha, Kans.

[21] Appl. No.: 919,944

[22] Filed: Aug. 29, 1997

[51] Int. Cl.$^6$ .............................. A23G 7/00; B28B 11/00; B29C 47/00
[52] U.S. Cl. .............................. 426/289; 118/15; 118/23; 264/130; 264/131; 264/211.12; 425/72.1; 425/96; 425/313; 426/294; 426/516
[58] Field of Search .................................... 426/289, 294, 426/516; 425/72.1, 90, 96, 311, 313; 118/15, 23, 25, 40; 264/130, 131, 142, 211.12

[56] References Cited

U.S. PATENT DOCUMENTS 4,897,275   1/1990   Nagai et al. .............................. 426/289
5,139,801   8/1992   de Jesus Montemayor et al. .. 426/289

*Primary Examiner*—George Yeung
*Attorney, Agent, or Firm*—Hovey, Williams, Timmons & Collins

[57] ABSTRACT

An improved extrusion processing system (10) for sticky extrudates such as candy products is provided which includes an extruder (12) equipped with a die (16) presenting an outlet face (23) and a knife assembly (19) and a knife hood (18). The system (10) further has a particulate delivery unit (20) which serves to direct a stream of particulate substance under positive pressure onto the outlet face (23) of extrusion die (16). The delivery unit (20) includes a container (42) for holding a supply of a particulate substance such as starch or sugar together with conduits (52, 56) adapted for coupling with a source of pressurized air and connected with container (42); a stream of the particulate substance under pressure is created and delivered via conduit (56) to hood (18) where it passes through delivery tube (60) for application onto outlet face (23).

12 Claims, 1 Drawing Sheet

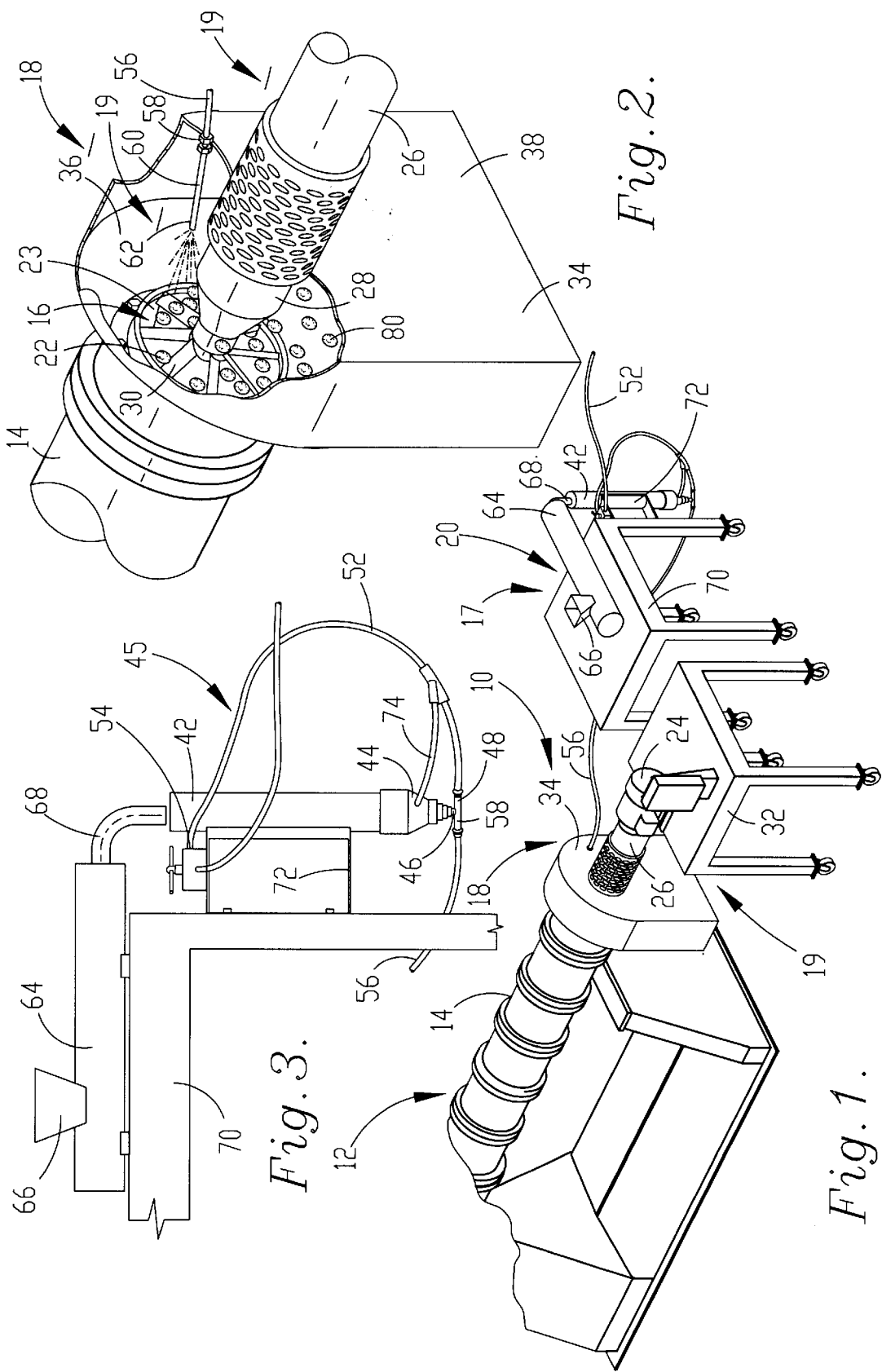

— 5,849,347 —

METHOD AND APPARATUS FOR APPLICATION OF ANTI-AGGLOMERATION PARTICULATES ONTO CUT EXTRUDATES

BACKGROUND OF THE INVENTION

1. Field of the Invention

The present invention is broadly concerned with improved apparatus for the processing of extruded material in order to minimize the tendency of such material to stick together or agglomerate, or otherwise foul processing equipment. More particularly, the invention pertains to such apparatus and methods wherein a pressurized stream of particulate material such as starch or sugar is directed onto the outlet face of an extrusion die during cutting of extrudate, so as to reduce the stickiness of the cut extrudate pieces.

2. Description of the Prior Art

Extrusion technology can be employed to process a wide variety of edible materials. Generally speaking, an extruder includes an elongated tubular barrel with one or two elongated, helically flighted, axially rotatable screws positioned within the barrel. An apertured die plate is affixed to the outlet end of the barrel so as to assist in generating heat and shear within the extruder and to shape the final product. Very commonly, a knife assembly is mounted adjacent the outlet face of the extrusion die. Such knife assemblies include a series of rotatable blades which cut the emerging extrudate into pieces.

Conventional extrusion systems operate very satisfactorily for the processing of proteinaceous or farinaceous feed products. A problem can be encountered, however, when attempts are made to process extrudates having high quantities of sugar, moisture, and/or other additives which promote stickiness; also specific processing conditions can lead to excessively sticky products. Sticky extrudates have a tendency to agglomerate as they are being cut and otherwise foul the die and knife assembly. For example, sugar candy-type or fruit gel products can be produced by extrusion techniques; however, these extrudates are extremely sticky to the point of creating severe processing problems at the outlet face of the extruder die.

It has been known in the past to provide a supply of starch material positioned directly above the outlet face of an extruder die so that the starch can descend under the influence of gravity for coating of the die face with starch. This expedient is sometimes useful, but has been found to be an inadequate response in the case of extremely sticky, high-sugar products.

There is accordingly a need in the art for an improved method and apparatus for reducing the sticking tendency of extrudate pieces which would otherwise present severe processing problems.

SUMMARY OF THE INVENTION

The present invention overcomes the problems outlined above and provides improved apparatus for the processing of extruded material as it emerges from the outlet face of an extrusion die in order to lessen the sticking tendency of the extrudate. Broadly speaking, the apparatus of the invention includes a knife assembly adjacent the die and including at least one shiftable knife blade proximal to the outlet face of the die for cutting the extruded material into discrete pieces. A hood is disposed about the knife blade and die outlet face, in order to confine the extrudate pieces and to direct the pieces for collection and downstream processing. The overall apparatus of the invention further includes means for delivery of a particulate substance onto the die outlet face including a container for holding a supply of the particulate substance, and a conduit assembly adapted for coupling with a source of pressurized air and operably coupled with the container for creating a pressurized stream of the particulate substance. The conduit assembly includes a delivery end having an outlet within the confines of the hood and oriented to deliver the particulate substance under pressure onto the die outlet face.

Normally, the knife assembly includes a plurality of shiftable, spaced apart knife blades and a hood includes an open lower end permitting gravitation of the cut extrudate pieces from the hood onto a conveyor or other collection apparatus.

In alternate forms, pneumatic conveying systems coupled with the hood can be employed. In such cases, the particulate substance would be filtered out of the conveying air stream after downstream cyclone separation of the extrudate pieces.

The preferred particulate container is in the form of an open top upright body, whereas the conduit assembly includes a venturi tee fitting having a pair of legs adjacent the bottom of the body. A first conduit adapted for connection to a source of pressurized air is coupled to one leg of the tee, while a second conduit is connected to the other tee leg. The second conduit leads to the knife hood and is operably connected with a metallic flexible tube within the confines of the hood.

In operation, a desired particulate material (e.g., starch or sugar) is directed under positive pressure onto the die outlet face. It has been found that this technique significantly improves the processing and handling of extrudates which would otherwise be troublesome because of their tendency to stick together and/or foul the processing equipment.

BRIEF DESCRIPTION OF THE DRAWINGS

FIG. 1 is a fragmentary perspective view illustrating an extruder setup including the processing apparatus of the invention;

FIG. 2 is a fragmentary perspective view with parts broken away and depicting the operation of the extruder setup wherein a particulate substance is directed under pressure onto the outlet face of the extruder die; and FIG. 3 is a fragmentary side view illustrating in more detail the preferred particulate substance container and related structure.

DETAILED DESCRIPTION OF THE PREFERRED EMBODIMENT

Turning now to the drawings, an extrusion processing system 10 is illustrated in FIG. 1. The system 10 includes a fragmentarily depicted extruder 12 including an elongated barrel 14 equipped with an endmost, apertured extrusion die 16 (see FIG. 2). Furthermore, the overall system 10 includes an assembly 17 in accordance with the invention designed to facilitate the cutting and handling of sticky extrudates. The assembly 17 includes hood 18, knife assembly 19, and a particulate delivery unit 20.

In more detail, the extruder 12 is entirely conventional and includes, in addition to segmented barrel 14, an elongated, helically flighted, axially rotatable screw (not shown) within barrel 14. As those skilled in the art will readily understand, the extruder 12 includes a barrel inlet upstream of the die 16. Very commonly, the materials to be extruded are first preconditioned in a separate mixer/preconditioner positioned above the barrel inlet.

The die 16 is also of conventional design and is bolted to the outlet end of barrel 14. In the embodiment illustrated, the die is provided with a series of circumferentially spaced openings 22 therethrough which are designed for shaping of extrudate from barrel 14; the openings 22 pass through the outlet face 23 of the die 16.

The knife assembly 19 includes a drive motor 24, drive shaft 26 and knife head 28. The head 28 supports a plurality of spaced apart knife blades 30 positioned directly against the outlet face 23 of die 16. As shown, the motor 24 and related structure is supported on a wheeled table 32 which can be positioned in front of extruder barrel 14.

Hood 18 is in the form of a hollow metallic body 34 having an arcuate upper end and which surrounds die outlet face 23, knife head 28 and blades 30. For this purpose, the front and rear plates 36, 38 of body 34 are apertured to receive, respectively, die 16 and drive shaft 26. In operation, the blades 30 are rotated under the medium of drive motor 24 and drive shaft 26 so that, as extrudate emerges from die outlet face 23, it is cut into extrudate pieces 40. As best illustrated in FIG. 2, the hood 18 operates to protect the knife head and blades, and to confine the extrudate pieces 40. Furthermore, the hood 18 has an open bottom so as to allow the pieces to gravitationally descend from the hood for collection on a conveyor or other conventional equipment (not shown).

The unit 20 includes an open top, upright container body 42 having a tapered base 44 and which is adapted to hold supplies of particulate substance. A conduit assembly 45 is operably coupled with the container body 42 and includes a conventional, commercially available venturi tee fitting 46 having opposed legs 48, 50 is affixed to the lower end of base 44. The assembly 45 further has a first conduit 52 coupled with tee leg 48 and adapted for connection with a source of pressurized air, such as plant compressed air or an air pump. As shown, a pressure regulator 54 is interposed within first conduit 52. A second conduit 56 extends from tee leg 50 to hood 18. As best illustrated in FIG. 2, the rear plate 38 of hood 18 is equipped with a bulk head union 58 which receives the end of conduit 56 remote from container body 42. A flexible metallic delivery tube 60 having an outlet end 62 is also secured to union 58 as shown, and is within the confines of hood 18.

In order to supply particulate material to container body 42, use is made of a conventional screw feeder 64 having an inlet hopper 66 and outlet 68. The outlet 68 is positioned above the open top of container body 42 for this purpose.

Preferably, a portable table 70 is used to support screw feeder 64 and body 42. The screw feeder is located on the top of the table 70 whereas the body 42 is supported by means of a bracket 72 extending from a table leg. Also, the regulator 54 is mounted on the bracket 72. In this way, the container body and related apparatus can be moved to a convenient location in the proximity of extruder 12.

In order to prevent bridging or caking of particulate substance within container body 42, a slip stream conduit 74 is provided between conduit 52 and the tapered base 44. The conduit 74 serves to direct a stream of pressurized air into the interior of the container body 42 so as to agitate the particulate substance therein.

In the use of system 10, extrusion processing is carried out in the usual manner. However, in order to reduce the sticking tendency of the extrudate emerging from outlet face 23 of die 16, the unit 20 is employed. In these operations, a particulate substance such as starch or sugar is fed via screw feeder 64 to container body 42. Positive pressure air from conduit 52 passes through venturi fitting 46, serving to draw particulate substance from the body 42, thereby generating a pressurized stream of the substance which is delivered via conduit 56 to tube 60. As the substance emerges from the end 62 of tube 60, it is directed onto outlet face 23 of die 16. The slip stream of air delivered through conduit 74 serves to agitate the substance within the container body 42. As indicated, the preferred delivery tube 16 is formed of a flexible metallic material such as copper. In this way, the tube can be bent or otherwise oriented for directing the particulate substance onto desired areas of the outlet face 23. In addition, it is also contemplated that multiple delivery tubes 60 could be employed by way of a conventional splitter so that individual streams of the particulate substance can be directed onto respective die face areas.

In practice, it has been found that the substance stream should be under a pressure of from about 3–40 psi and more preferably from about 3–20 psi. In terms of use quantities, the particulate substance is usually directed onto the die outlet face at a rate from about 0.2–15 lbs/min. (more preferably from about 0.5–5 lbs/min.) per 100 pounds of extrudate per hour generated by the extrusion process. That is, with an extruder system generating 1,000 pounds per hour of extrudate, the particulate substance would be used at a level of from about 2–150 lbs/min.

A variety of particulate substances can be used, so long as the ends of the invention are met. Particulate starch and sugar are deemed to be the best materials, owing to ready availability and low cost. The particulate sizes can also vary, typically from a mean particle size of from about 1–150 microns (more preferably from about 5–30 microns); in the case of starch, good results have been obtained using a mean particle size of about 14 microns.

Although the processing apparatus has been illustrated in connection with conventional cooking extruder devices, the invention is not so limited. That is, it can be used to good effect with any type of device involving passage of a material through a restricted orifice die. Therefore, as used herein, the terms "extruder" and "extrusion process" should be broadly construed to cover all such equipment and methods.

We claim:

1. Apparatus for processing of extruded material as the material emerges from the outlet face of an extrusion die, said apparatus comprising:

a knife assembly adjacent said die and including at least one shiftable knife blade proximal to said outlet face of the die for cutting said extruded material into pieces;

a hood disposed about said knife blade and outlet face; and means for delivery of a particulate substance onto said die outlet face for lessening the sticking tendency of said cut pieces, including a container for holding a supply of said particulate substance, and a conduit assembly adapted for coupling with a source of pressurized air and operably coupled with said container for creating a pressurized stream of said particulate substance, said conduit assembly including a delivery end having an outlet within the confines of said hood and oriented to deliver said particulate substance under pressure onto said die outlet face.

2. The apparatus of claim 1, said knife assembly including a plurality of shiftable, spaced apart knife blades.

3. The apparatus of claim 1, said hood having an open lower end for permitting said cut pieces to fall under the influence of gravity from the hood.

4. The apparatus of claim 1, said container comprising an open top, upright body, said conduit assembly including a venturi tee fitting having a pair of legs adjacent the bottom of said body, there being a first conduit adapted for connection to said source of pressurized air and connected to one leg of said tee fitting, and a second conduit connected to the other leg of said tee fitting, said second conduit leading to said hood, said delivery end comprising a tube, said second conduit operably coupled with said tube.

5. The apparatus of claim 4, including a screw feeder adjacent the open top of said body for feeding particulate material into the body.

6. The apparatus of claim 4, including a regulator interposed within said first conduit.

7. The apparatus of claim 4, including a slip stream conduit operably connected between said first conduit and said body for delivery of pressurized air into the interior of the body in order to agitate said particulate substance therein.

8. A method of reducing the sticking tendency of cut extrudate pieces generated during an extrusion process wherein extrudate emerges from the outlet face of an extrusion die and is cut into pieces, said method comprising the step of directing a stream of particulate substance under positive pressure onto said die outlet face.

9. The method of claim 8, said substance selected from the group consisting of particulate starch and sugar.

10. The method of claim 8, said stream being under a pressure of from about 3–40 psi.

11. The method of claim 8, said particulate substance being directed onto said die outlet face at a rate of from about 0.2–15 lbs/min. of particulate substance per 100 pounds of extrudate per hour generated by the extrusion process.

12. The method of claim 11, said rate being from about 0.5–5 lbs/min. of particulate substance per 100 pounds of extrudate per hour generated by the extrusion process.

* * * * *